(12) United States Patent
Shiokawa

(10) Patent No.: US 12,712,580 B2
(45) Date of Patent: Aug. 18, 2026

(54) ELEMENT MOUNTING SUBSTRATE AND ADJUSTMENT METHOD

(71) Applicant: Murata Manufacturing Co., Ltd., Kyoto-fu (JP)

(72) Inventor: Noboru Shiokawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 809 days.

(21) Appl. No.: 18/170,139

(22) Filed: Feb. 16, 2023

(65) Prior Publication Data

US 2023/0198564 A1 Jun. 22, 2023

Related U.S. Application Data

(63) Continuation of application No. PCT/JP2021/021588, filed on Jun. 7, 2021.

(30) Foreign Application Priority Data

Oct. 12, 2020 (JP) ................................ 2020-172062

(51) Int. Cl.
*H04B 1/10* (2006.01)
*H01F 27/06* (2006.01)

(52) U.S. Cl.
CPC .............. *H04B 1/10* (2013.01); *H01F 27/06* (2013.01)

(58) Field of Classification Search
CPC ......... H04B 1/10; H01F 27/06; H01F 17/045; H01F 27/292; H03H 7/01; H05K 1/02
USPC ................................ 333/156, 167, 175, 185
See application file for complete search history.

(56) References Cited

U.S. PATENT DOCUMENTS

2019/0013789 A1* 1/2019 Mori .................... H03H 7/1766
2019/0280668 A1* 9/2019 Harada ................ H04B 1/0057

FOREIGN PATENT DOCUMENTS

| | | | |
|---|---|---|---|
| JP | H05-145364 | A | 6/1993 |
| JP | H06-120705 | A | 4/1994 |
| JP | 2008-251808 | A | 10/2008 |
| JP | 2010-232988 | A | 10/2010 |
| JP | 2011-019004 | A | 1/2011 |
| JP | 2018-082105 | A | 5/2018 |
| WO | 2006/112010 | A1 | 10/2006 |
| WO | 2017/094062 | A1 | 6/2017 |

(Continued)

OTHER PUBLICATIONS

International Search Report issued in PCT/JP2021/021588; mailed Jul. 6, 2021.

*Primary Examiner* — Jorge L Salazar, Jr.
(74) *Attorney, Agent, or Firm* — Studebaker Brackett PLLC

(57) ABSTRACT

An element mounting substrate includes a substrate, a first impedance element and a second impedance element on a main surface of the substrate and each having an electrode, and a transmission line on the substrate and having a first end connected to the electrode of the first impedance element and a second end connected to the electrode of the second impedance element. The first impedance element and the second impedance element are electrically connected in series via the transmission line on the substrate, and a line length between the first end and the second end in the transmission line is longer than a shortest distance between the first end and the second end.

20 Claims, 9 Drawing Sheets

(56) References Cited

FOREIGN PATENT DOCUMENTS

| | | | |
|---|---|---|---|
| WO | 2017/159112 | A1 | 9/2017 |
| WO | 2018/225590 | A1 | 12/2018 |

* cited by examiner

ELEMENT MOUNTING SUBSTRATE AND ADJUSTMENT METHOD

CROSS-REFERENCE TO RELATED APPLICATION

This application claims benefit of priority to International Patent Application No. PCT/JP2021/021588, filed Jun. 7, 2021, and to Japanese Patent Application No. 2020-172062, filed Oct. 12, 2020, the entire contents of each are incorporated herein by reference.

TECHNICAL FIELD

The present disclosure relates to an element mounting substrate and an adjustment method.

BACKGROUND ART

In electronic devices, since superimposition of wireless communication radio waves from mobile phones or wireless LAN devices as external noise on communication signals flowing within the devices causes malfunctions, erroneous motions, and other problems, a noise filter is used to remove such external noise. In the noise filter, since the usable frequency band of the wireless communication radio wave is limited, a noise countermeasure method has been adopted in which the usable frequency band is matched with a self-resonant frequency of a filter circuit including an impedance element such as an inductor, and a specific frequency band is set to high impedance in a transmission line of a communication signal in the electronic device to attenuate external noise.

In this case, in the noise filter, a method is generally used in which an air-core inductor having a sharp resonance and a high Q value is employed and a narrow band near a specific frequency is set to high impedance. In addition, to attenuate external noise in a plurality of bands such as the 800 MHz band for cellular phone communication and the 1.5 GHz band for wireless LAN communication, the design is adopted in which a filter circuit for setting a narrow band near 800 MHz to high impedance and a filter circuit for setting a narrow band near 1.5 GHz to high impedance are used, while antiresonance between the filter circuits prevents attenuation in frequency bands other than the frequency band of the external noise. For this reason, when the frequency band of the external noise is a wide band or when the frequency bands of a plurality of external noises are close to each other, it is not possible to take appropriate noise control measures.

Therefore, there has been proposed a noise countermeasure method in which an inductor component using a magnetic ceramic material having a relative magnetic permeability of greater than 1 is employed in a filter unit, thereby purposefully reducing the Q value of the filter unit to make the resonance dull and to widen a frequency band with high impedance in a transmission line.

For example, Japanese Unexamined Patent Application Publication No. 2010-232988 discloses an element mounting substrate in which three inductors are prepared and the three inductors are electrically connected in series via a transmission line on the substrate.

SUMMARY

However, it has been found that the following problems occur when the existing element mounting substrate is actually manufactured and used. When an attempt is made to reduce the size of an element mounting substrate in order to cope with the reduction in the size of electronic devices, it is necessary to arrange a plurality of inductors on the substrate in a state of being close to each other. The inventor's examination has shown that, as described above, when the transmission lines between the plurality of inductors are connected at the shortest distance, the attenuation characteristics of the filter unit composed of the plurality of inductors and the transmission lines are lowered.

Therefore, the present disclosure provides an element mounting substrate and an adjustment method in which a filter unit can obtain high attenuation characteristics in a wide band.

An element mounting substrate according to an aspect of the present disclosure includes a substrate; a first impedance element and a second impedance element arranged on a main surface of the substrate and having an electrode; and a transmission line provided on the substrate and having a first end connected to the electrode of the first impedance element and a second end connected to the electrode of the second impedance element. The first impedance element and the second impedance element are electrically connected in series via the transmission line on the substrate, and a line length between the first end and the second end in the transmission line is longer than a shortest distance between the first end and the second end.

A transmission line generally has a specific characteristic impedance (for example, 50Ω).

Therefore, according to the above-described aspect, it is possible for a filter unit composed of the first impedance element, the transmission line, and the second impedance element to obtain high attenuation characteristics in a wide band by using the characteristic impedance of the transmission line.

In addition, an element mounting substrate according to one embodiment includes a substrate; a first impedance element and a second impedance element arranged on the substrate and having an electrode; and a transmission line provided on the substrate and having a first end connected to the electrode of the first impedance element and a second end connected to the electrode of the second impedance element. The first impedance element and the second impedance element are electrically connected in series via the transmission line on the substrate, and a line length between the first end and the second end in the transmission line is equal to or more than 0.2 mm.

According to the embodiment, it is possible for the filter unit composed of the first impedance element, the transmission line, and the second impedance element to obtain high attenuation characteristics in a wide band by using the characteristic impedance of the transmission line.

In addition, an element mounting substrate according to one embodiment includes substrate; a first impedance element and a second impedance element arranged on the substrate and having an electrode; and a transmission line provided on the substrate and having a first end connected to the electrode of the first impedance element and a second end connected to the electrode of the second impedance element. The first impedance element and the second impedance element are electrically connected in series via the transmission line on the substrate. Each of the first impedance element and the second impedance element has a longitudinal direction and a lateral direction parallel to the main surface and orthogonal to each other. A line length between the first end and the second end in the transmission line is equal to or more than a half of a length, which is not a longer length, of a first length of the first impedance element in the longitudinal direction and a second length of the second impedance element in the longitudinal direction.

According to the embodiment, it is possible for the filter unit composed of the first impedance element, the transmission line, and the second impedance element to obtain high attenuation characteristics in a wide band by using the characteristic impedance of the transmission line.

In addition, in an adjustment method according to one embodiment, by a line length of a transmission line that electrically connects an electrode of a first impedance element and an electrode of a second impedance element in series, an anti-resonant frequency of a signal passing through the first impedance element, the transmission line, and the second impedance element in this order is adjusted. According to the embodiment, it is possible to adjust the anti-resonant frequency of the filter unit composed of the first impedance element, the transmission line, and the second impedance element by using the characteristic impedance of the transmission line, and it is possible for the filter unit to obtain high attenuation characteristics in a wide band.

According to the element mounting substrate and the adjustment method according to an aspect of the present disclosure, it is possible for the filter unit to obtain high attenuation characteristics in a wide band.

DETAILED DESCRIPTION

Figure 1:
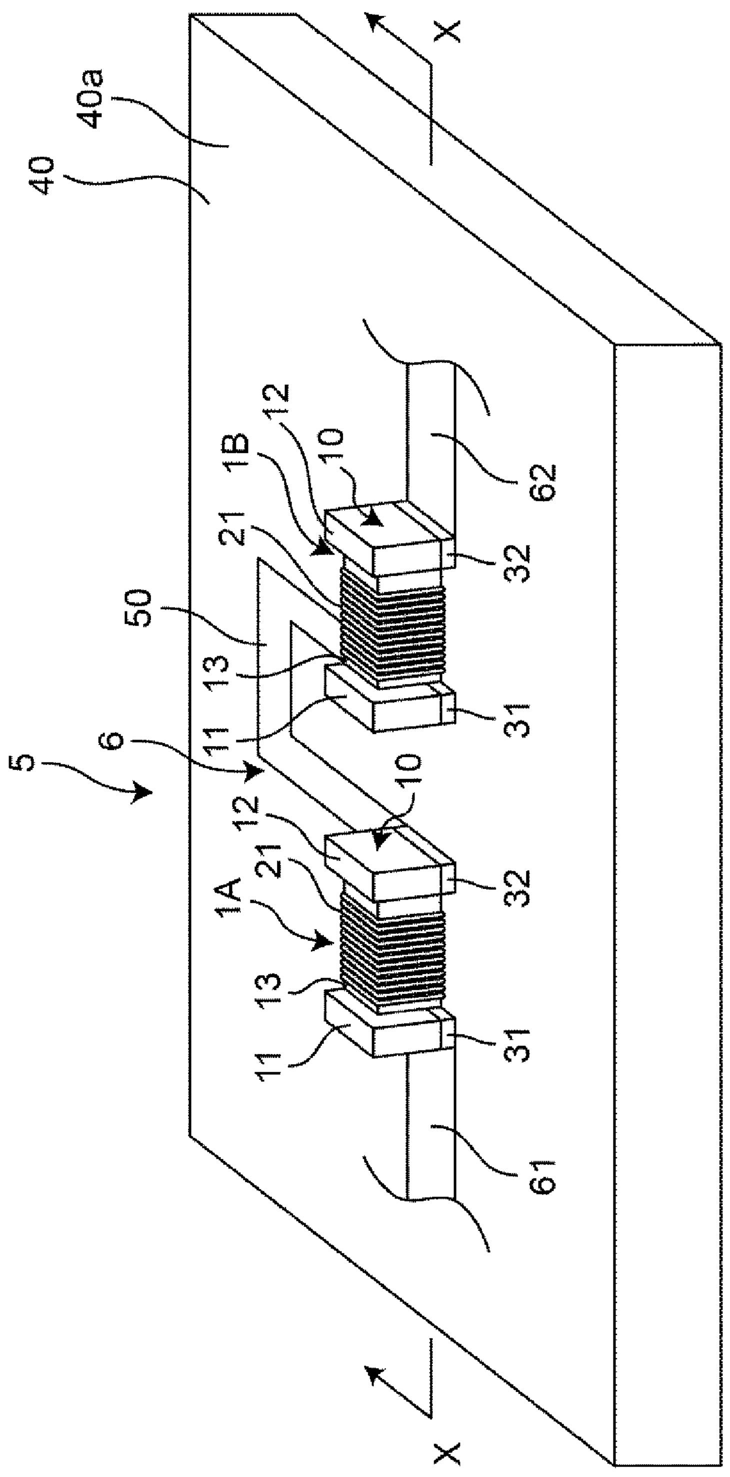
FIG. 1 is a perspective view illustrating an element mounting substrate of a first embodiment.

Hereinafter, an element mounting substrate according to an aspect of the present disclosure will be described in detail with reference to embodiments illustrated in the drawings. Note that the drawings are partially schematic and do not reflect actual dimensions or ratios in some cases.

First Embodiment

Figure 2:
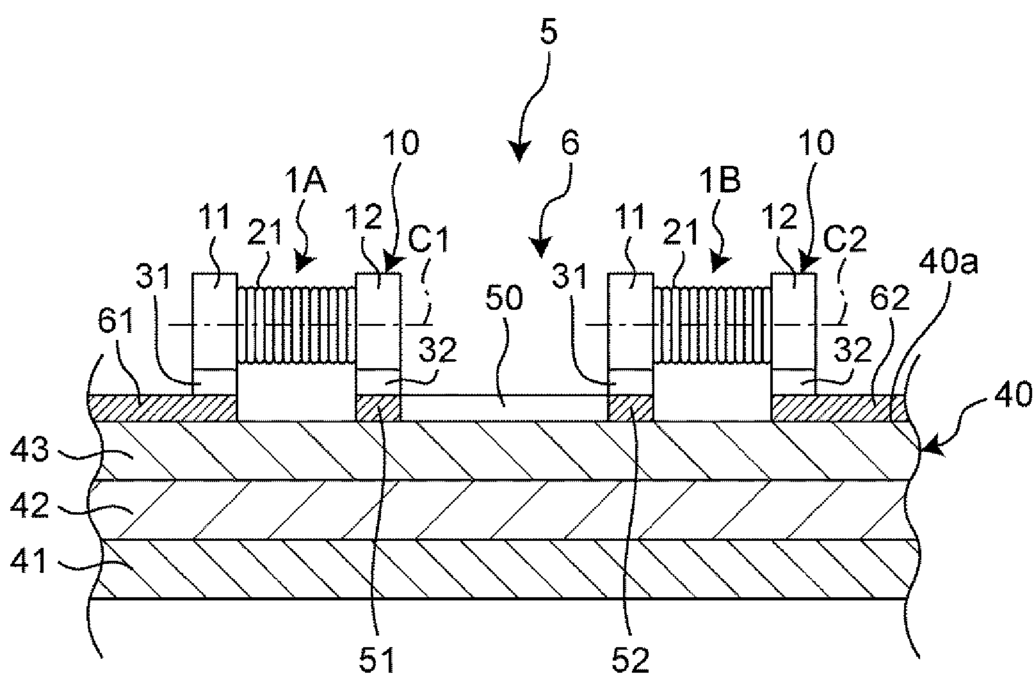
FIG. 2 is a cross-sectional view taken along line X-X in FIG. 1.
Figure 3:
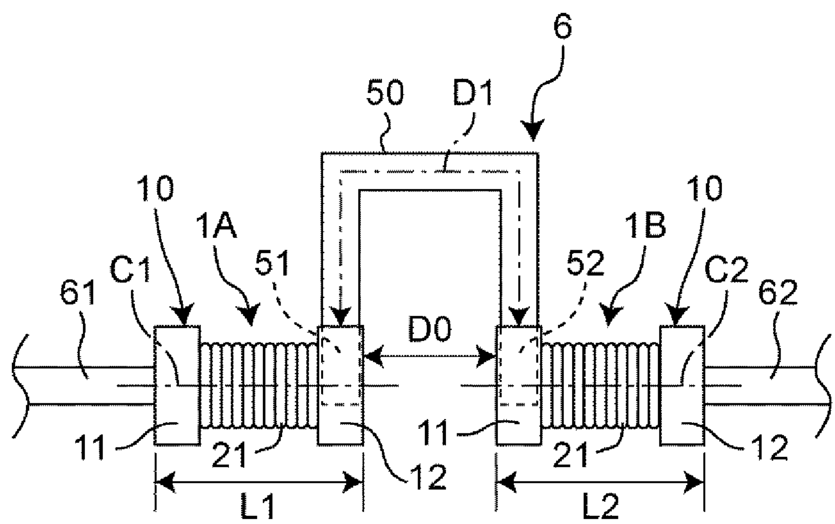
FIG. 3 is a plan view seen from a planar direction of FIG. 1.

FIG. 1 is a perspective view illustrating an element mounting substrate according to a first embodiment. FIG. 2 is a cross-sectional view taken along line X-X of FIG. 1. FIG. 3 is a plan view seen from a planar direction of FIG. 1. Although FIG. 2 illustrates a cross-sectional view in a plane including a first central axis C1 of a first impedance element 1A and a second central axis C2 of a second impedance element 1B and orthogonal to a main surface 40*a* of a substrate 40, the first impedance element 1A and the second impedance element 1B are not illustrated as cross-sectional views for ease of understanding.

As illustrated in FIG. 1, FIG. 2, and FIG. 3, an element mounting substrate 5 includes the substrate 40, the first impedance element 1A and the second impedance element 1B that are arranged on the main surface 40*a* of the substrate 40 and have electrodes 31 and 32, and a transmission line 50 provided on the substrate 40 and having a first end 51 connected to the electrode 32 of the first impedance element 1A and a second end 52 connected to the electrode 31 of the second impedance element 1B. Although not illustrated, on the substrate 40 in the element mounting substrate 5, the first impedance element 1A and the second impedance element 1B are electrically connected in series via the transmission line 50. Thus, the first impedance element 1A, the transmission line 50, and the second impedance element 1B constitute a filter unit 6 as a filter circuit.

The first impedance element 1A and the second impedance element 1B are inductors in this embodiment. Hereinafter, the configuration of the first impedance element 1A will be described. Since the second impedance element 1B has the same configuration, the description thereof will be omitted.

The first impedance element 1A includes a core 10, the first electrode 31 and the second electrode 32 provided on the core 10, and a wire 21 wound around the core 10 and electrically connected to the first electrode 31 and the second electrode 32.

The first impedance element 1A has a longitudinal direction and a lateral direction that are parallel to the main surface 40*a* of the substrate 40 and orthogonal to each other. A straight line parallel to the longitudinal direction and passing through the center in the lateral direction is referred to as the first central axis C1 of the first impedance element 1A. That is, the first central axis C1 is not a straight line (line segment) only within the first impedance element 1A, but is an infinite straight line obtained by extending both ends of the line segment. Note that the same applies to the second central axis C2 of the second impedance element 1B.

The core 10 includes a winding core portion 13 having a shape extending in a certain direction, a first flange portion 11 provided at a first end in an extending direction of the winding core portion 13 and projecting in a direction orthogonal to the extending direction, and a second flange portion 12 provided at a second end in the extending direction of the winding core portion 13 and projecting in the direction orthogonal to the extending direction. The shape of the winding core portion 13, the shape of the first flange portion 11, and the shape of the second flange portion 12 are, for example, a rectangular parallelepiped, but are not limited thereto, and may be other shapes, for example, a polygonal prism other than a rectangular parallelepiped, such as a pentagonal prism and a hexagonal prism, or a cylinder. Further, a part thereof may be a curved surface. The axis passing through the center of the winding core portion 13 in the extending direction of the winding core portion 13 coincides with the first central axis C1 of the first impedance element 1A. The first central axis C1 of the first impedance element 1A can also be referred to as a winding axis of the wire 21.

As the material of the core 10, for example, a magnetic material such as a sintered body of ferrite or a molded body of a magnetic powder-containing resin is preferable, and a non-magnetic material such as alumina, a non-magnetic powder-containing resin, or a resin not containing a filler may be used. In addition, it may also be a dielectric such as a sintered body of ceramics, an amorphous solid such as glass, a crystalline body containing Si as a main raw material, or a molded body of resin or the like. The core 10 is solid but may be hollow (air-core). The permeability of the core 10 is preferably greater than 1. Note that, hereinafter, the lower-side surface (the surface on the substrate 40 side) of the core 10 is referred to as the surface on the side mounted on the substrate 40.

The first electrode 31 is provided on the lower surface of the first flange portion 11, and the second electrode 32 is provided on the lower surface of the second flange portion 12. The first electrode 31 and the second electrode 32 are formed, for example, by applying and baking a conductive paste containing silver (Ag) as a conductive component, or by sputtering nickel (Ni)-chromium (Cr) or nickel (Ni)-copper (Cu). In addition, when necessary, a plating film may be further formed. As a material of the plating film, for example, a metal such as tin (Sn), Cu, or Ni, or an alloy such as Ni—Sn may be used. Note that the plating film may have a multilayer structure, or two or more types of plating may be used.

The wire 21 is wound around the winding core portion 13 to form a coil. The wire 21 is, for example, a conductive wire with an insulating coating in which a conductive wire made of metal such as copper is covered with a coating made of resin such as polyurethane or polyamide-imide. One end of the wire 21 is electrically connected to the first electrode 31, and the other end of the wire 21 is electrically connected to the second electrode 32. The wire 21 is connected to the first and second electrodes 31 and 32 by, for example, thermo-pressure bonding, brazing, welding, or the like.

When the first impedance element 1A is mounted on the substrate 40, the lower surface of the first flange portion 11 and the lower surface of the second flange portion 12 face the main surface 40*a* (upper surface) of the substrate 40. At this time, the first central axis C1 of the first impedance element 1A is parallel to the main surface 40*a* of the substrate 40. That is, the first impedance element 1A is of a transverse winding type in which the winding axis of the wire 21 is parallel to the substrate 40.

Note that the first impedance element 1A may further include a cover member (not illustrated). The cover member is provided on the upper surface and the side surface of the winding core portion 13 so as to cover the wire 21 wound around the winding core portion 13. As a material of the cover member, for example, an epoxy-based resin can be used. For example, when the first impedance element 1A is mounted on the substrate 40, the cover member makes it possible to reliably perform suction by a suction nozzle. Further, the cover member prevents the wire 21 from being damaged at the time of suction by the suction nozzle.

The substrate 40 has insulating properties and is made of, for example, phenol resin, epoxy resin, fluororesin, ceramic, or the like. The substrate 40 is, for example, a multilayer substrate, and includes a first layer 41, a second layer 42, and a third layer 43 as illustrated in FIG. 2. The first layer 41, the second layer 42, and the third layer 43 are stacked in this order from bottom to top. A first line 61 and a second line 62 as signal lines are arranged on the third layer 43 (the main surface 40*a* of the substrate 40). The first line 61 is an input-side signal line, and the second line 62 is an output-side signal line. For example, a power supply line and a ground line are arranged in the first layer 41 and the second layer 42.

The first electrode 31 of the first impedance element 1A is connected to the first line 61, and the second electrode 32 of the second impedance element 1B is connected to the second line 62. The second electrode 32 of the first impedance element 1A is connected to the first end 51 of the transmission line 50, and the first electrode 31 of the second impedance element 1B is connected to the second end 52 of the transmission line 50. Thus, the first line 61, the first impedance element 1A, the transmission line 50, the second impedance element 1B, and the second line 62 are connected in series. A signal is input to the first line 61 and output from the second line 62. Note that although not illustrated for the sake of convenience, the electrodes 31 and 32 are bonded to the first end 51 and the second end 52 of the transmission line 50 with a conductive bonding agent such as solder.

The first impedance element 1A and the second impedance element 1B are magnetically coupled to each other. The transmission line 50 is a wiring designed to have a specific characteristic impedance (for example, 50Ω). The transmission line 50 is provided on the main surface 40*a* of the substrate 40, and the transmission line 50 can be easily wired. The first line 61 and the second line 62 have the same configuration as that of the transmission line 50.

As illustrated in FIG. 3, a line length D1 between the first end 51 and the second end 52 of the transmission line 50 is longer than a shortest distance D0 between the first end 51 and the second end 52. The line length D1 of the transmission line 50 is a length at the center line of the transmission line 50, and in this case, is a length at the center line in the width direction of the transmission line 50 when viewed from a direction orthogonal to the main surface 40*a* of the substrate 40 (hereinafter referred to as a plan view). According to this configuration, since the line length D1 of the transmission line 50 is longer than the shortest distance D0, it is possible for the filter unit 6 to obtain high attenuation characteristics in a wide band by using the characteristic impedance of the transmission line 50. As a result, in the element mounting substrate 5, it is possible to achieve countermeasures against noise in a wide frequency band.

To be more specific, the first impedance element 1A and the second impedance element 1B have high impedance in a predetermined band of frequencies, and thus are equivalently capacitor elements in a band of frequencies higher than the self-resonant frequency. The transmission line 50 between the first impedance element 1A and the second impedance element 1B behaves equivalently as a wave resonator in a band of frequencies higher than the self-resonant frequency by the first impedance element 1A and the second impedance element 1B connected to both ends of the transmission line 50, but due to impedance mismatch between the transmission line 50 and the first and second impedance elements 1A and 1B, the filter unit 6 obtains higher attenuation characteristics as the bandpass characteristics. The characteristic impedance of the transmission line 50 is preferably lower than the characteristic impedances of the first and second impedance elements 1A and 1B.

As described above, the present disclosure focuses on the transmission line 50 between the first impedance element 1A and the second impedance element 1B in order to obtain the filter unit 6 having high attenuation characteristics in a wide band, it is found that the attenuation characteristics of the filter unit 6 is controlled by adjusting the line length D1 of the transmission line 50, and consequently, an element mounting substrate enabling the filter unit 6 to obtain high attenuation characteristics in a wide band can be achieved.

Figure 4:
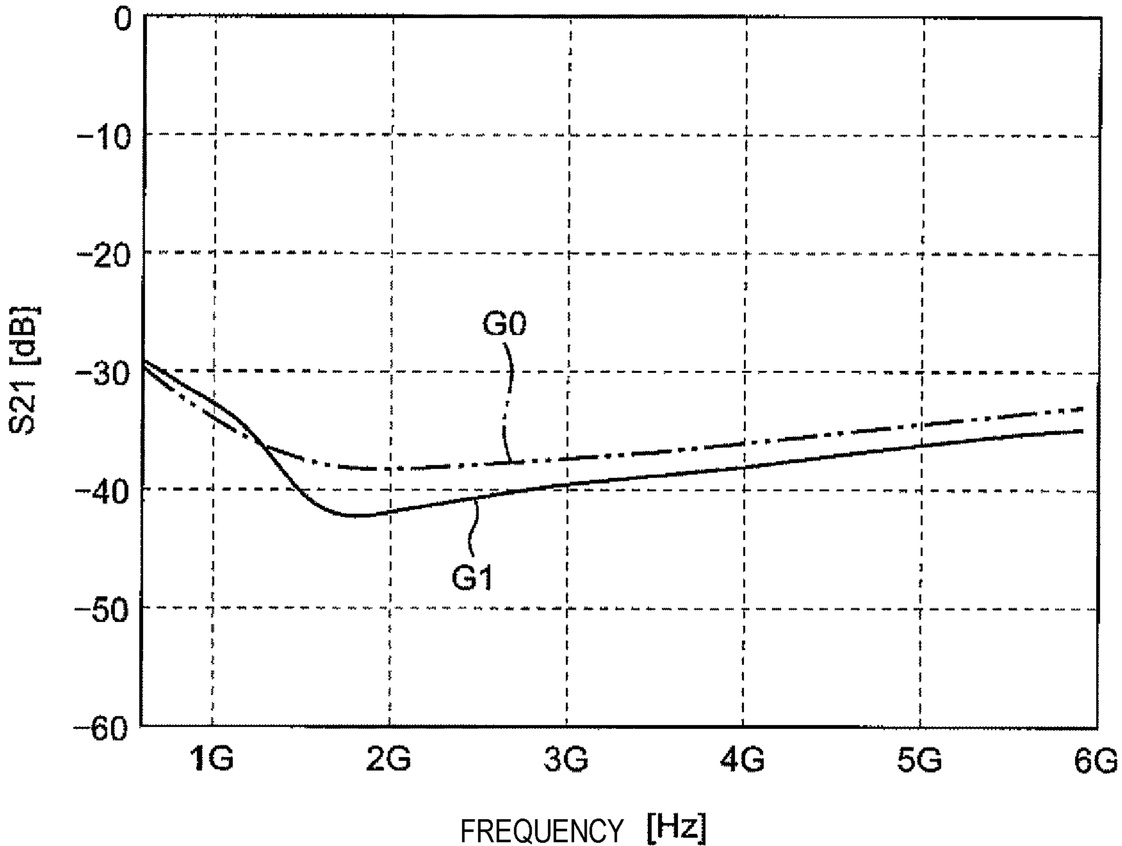
FIG. 4 is a graph illustrating a relationship between frequency and S21 in an example and a comparative example.

An example in this case will be described. FIG. 4 illustrates the relationship between frequency and S21 in the example and a comparative example. In the example, the line length D1 is 1.3 mm and the shortest distance D0 is 0.1 mm. In the comparative example, the line length D1 and the shortest distance D0 are 0.1 mm. As illustrated in FIG. 4, a graph G1 of the example shows that a high attenuation characteristic in a wide band can be obtained as compared with a graph G0 of the comparative example.

As illustrated in FIG. 3, the first central axis C1 of the first impedance element 1A and the second central axis C2 of the second impedance element 1B are located on the same straight line in a plan view. Here, "being on the same straight line" is not limited to being completely on the same straight line, but also includes being substantially on the same straight line. The second flange portion 12 of the first impedance element 1A and the first flange portion 11 of the second impedance element 1B are arranged to face each other. According to this configuration, it is possible to reduce the size of the element mounting substrate in the direction orthogonal to the first and second central axes C1 and C2.

Preferably, the line length D1 of the transmission line 50 is equal to or more than 1.05 times the shortest distance D0. According to this, antiresonance can be shifted to a low frequency region, and high attenuation characteristics in a wide band can be more reliably obtained. Preferably, the line length D1 of the transmission line 50 is equal to or less than five times the shortest distance D0. According to this, the element mounting substrate can be miniaturized without making the transmission line 50 longer than necessary.

Preferably, the line length D1 of the transmission line 50 is equal to or more than 0.2 mm. According to this, antiresonance can be shifted to a low frequency region, and high attenuation characteristics in a wide band can be more reliably obtained. Preferably, the line length D1 of the transmission line 50 is equal to or less than 1.0 mm. According to this, the element mounting substrate can be miniaturized without making the transmission line 50 longer than necessary.

Preferably, the line length D1 of the transmission line 50 is equal to or more than a half of the length, which is not a longer one, of a first length L1 of the first impedance element 1A in the direction of the first central axis C1 and a second length L2 of the second impedance element 1B in the direction of the second central axis C2. In this embodiment, the first length L1 and the second length L2 are the same length. The first length L1 and the second length L2 are, for example, 0.71 mm, and are preferably equal to or more than 0.66 mm and equal to or less than 0.76 mm (i.e., from 0.66 mm to 0.76 mm). According to this, antiresonance can be shifted to a low frequency region, and high attenuation characteristics in a wide band can be more reliably obtained. Preferably, the line length D1 of the transmission line 50 is equal to or less than 0.5 times the length, which is not a longer one, of the first length L1 and the second length L2. According to this, the element mounting substrate can be miniaturized without making the transmission line 50 longer than necessary.

As illustrated in FIG. 3, the shape of the transmission line 50 is a shape having three sides in a plan view, and adjacent sides are orthogonal to each other. According to this, the transmission line 50 can be easily formed. Note that the shape of the transmission line 50 is not limited to this shape and may be a shape as illustrated in FIG. 5A to FIG. 5C.

Figure 5A:
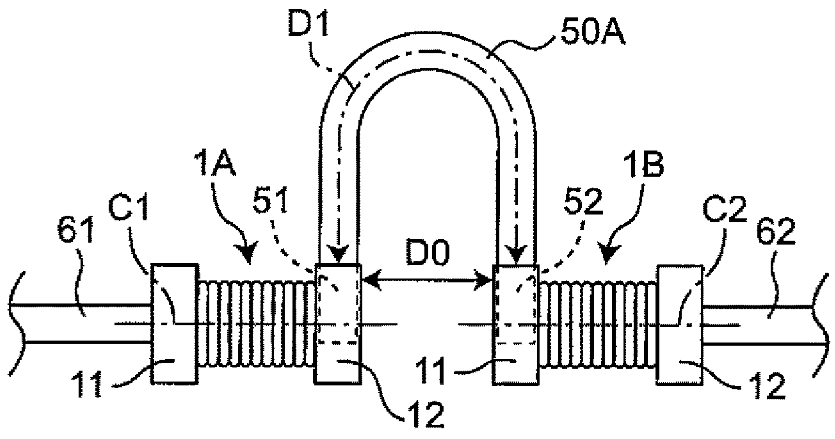
FIG. 5A is a plan view illustrating another shape of a transmission line.
Figure 5B:
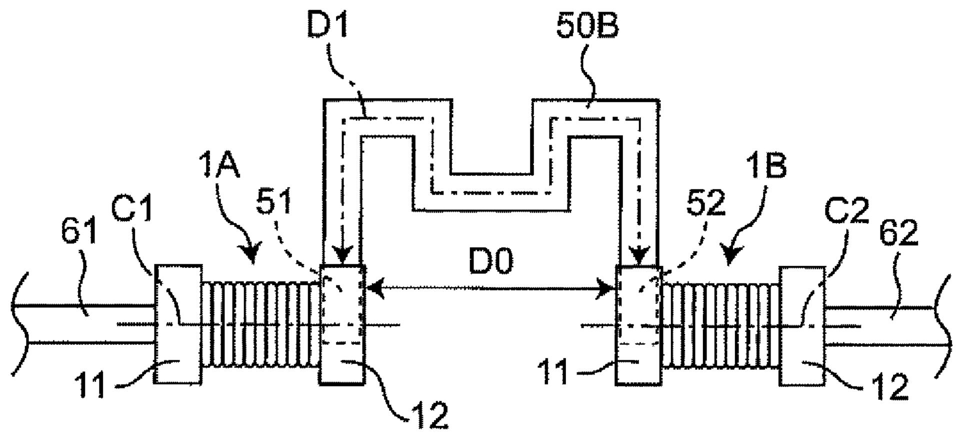
FIG. 5B is a plan view illustrating another shape of the transmission line.

As illustrated in FIG. 5A, the shape of a transmission line 50A may be a U shape in a plan view. According to this configuration, since the transmission line 50A does not have a corner portion, variation in characteristic impedance is small. As illustrated in FIG. 5B, the shape of a transmission line 50B may be a meander shape in a plan view. According to this, it is possible to easily ensure the line length D of the transmission line 50B.

Figure 5C:
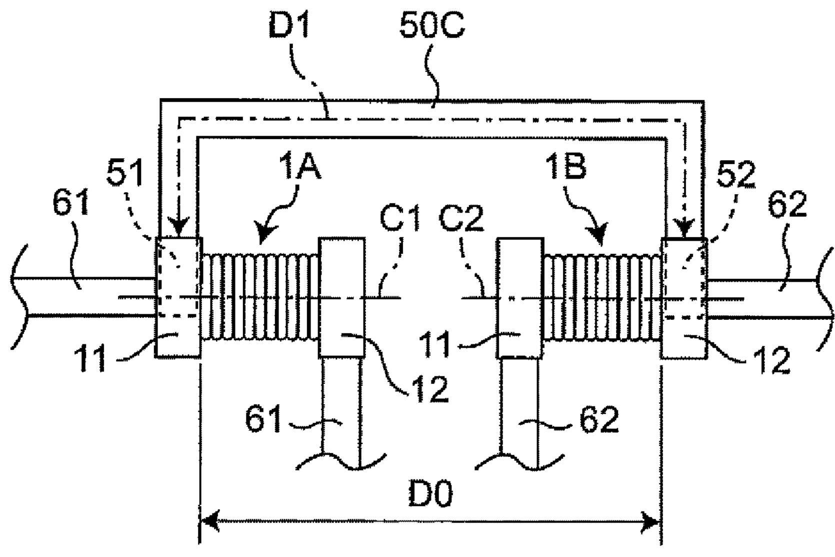
FIG. 5C is a plan view illustrating another shape of the transmission line.

As illustrated in FIG. 5C, the shape of a transmission line 50C is a shape having three sides in a plan view, but is longer than the transmission line 50 of FIG. 3. That is, the first end 51 of the transmission line 50C is connected to the first electrode 31 of the first impedance element 1A, and the second end 52 of the transmission line 50C is connected to the second electrode 32 of the second impedance element 1B. The first line 61 is connected to the second electrode 32 of the first impedance element 1A, and the second line 62 is connected to the first electrode 31 of the second impedance element 1B.

Figure 6A:
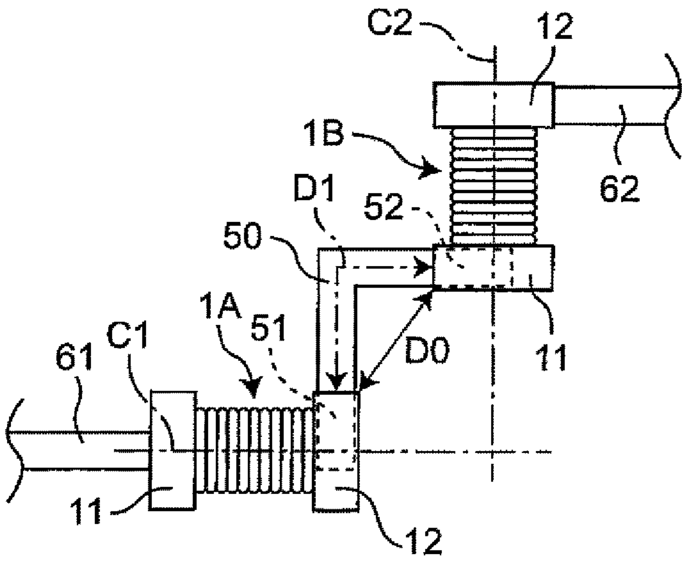
FIG. 6A is a plan view illustrating another positional relationship between a first impedance element and a second impedance element.
Figure 6B:
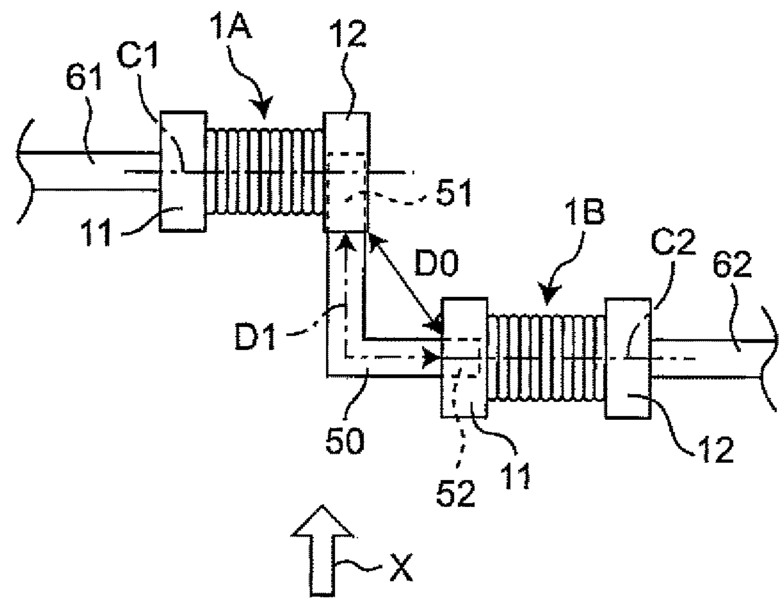
FIG. 6B is a plan view illustrating another positional relationship between the first impedance element and the second impedance element.

In addition, the relative positional relationship between the first impedance element 1A and the second impedance element 1B may be positional relationships as illustrated in FIG. 6A and FIG. 6B.

As illustrated in FIG. 6A, an extension line of the first central axis C1 of the first impedance element 1A and an extension line of the second central axis C2 of the second impedance element 1B may intersect (in this embodiment, be orthogonal to) each other at one point in a plan view. According to this configuration, degree of freedom of arrangement of the first impedance element 1A and the second impedance element 1B with respect to the substrate 40 is improved.

Note that the angle formed by the first central axis C1 and the second central axis C2 may be an angle other than a right angle in a plan view. In this case, the first impedance element 1A and the second impedance element 1B are preferably not lined up in a direction orthogonal to the first central axis C1 or the second central axis C2 in a plan view.

As illustrated in FIG. 6B, the first central axis C1 of the first impedance element 1A and the second central axis C2 of the second impedance element 1B may be parallel to each other in a plan view, and the first impedance element 1A and the second impedance element 1B are not necessarily lined up in a direction (a direction of an arrow X) orthogonal to the first central axis C1 and the second central axis C2 in a plan view. According to this configuration, the distance between the first impedance element 1A and the second impedance element 1B can be secured without separating the first impedance element 1A and the second impedance element 1B in the direction parallel to the first and second central axes C1 and C2, and as a result, the size of the element mounting substrate in the direction parallel to the first and second central axes C1 and C2 can be reduced.

Note that the winding direction of the wire 21 of the first impedance element 1A and the winding direction of the wire 21 of the second impedance element 1B may each be either right-handed or left-handed from the first electrode 31 toward the second electrode 32. Preferably, the winding direction of the first impedance element 1A and the winding direction of the second impedance element 1B are each forward directions with respect to the extending direction of the transmission line 50.

Second Embodiment

Figure 7:
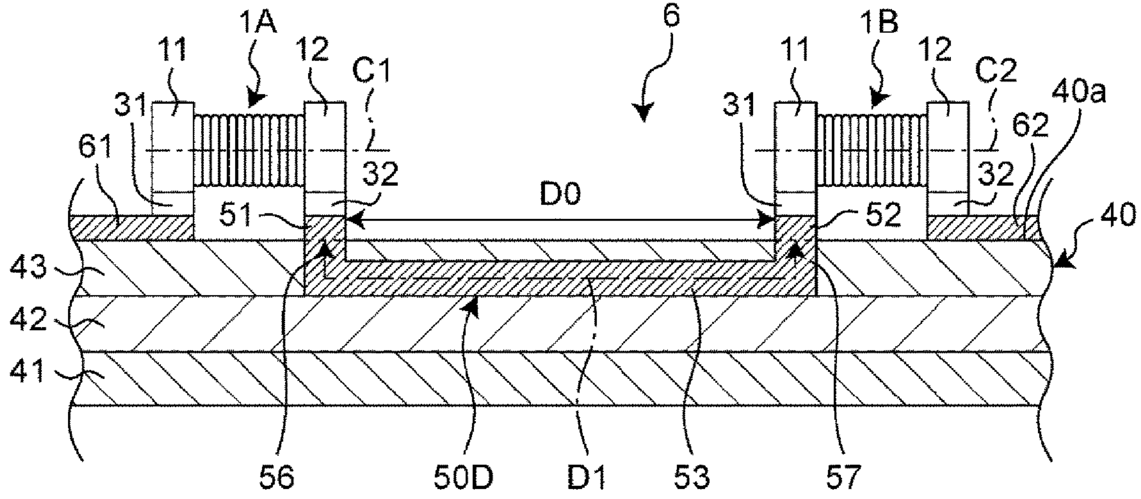
FIG. 7 is a cross-sectional view illustrating an element mounting substrate of a second embodiment.

FIG. 7 is a cross-sectional view illustrating an element mounting substrate of a second embodiment. The second embodiment is different from the first embodiment in the position where the transmission line is provided. This different configuration will be described below. The other configurations are the same as those of the first embodiment, and are denoted by the same reference numerals as those of the first embodiment, and descriptions thereof are omitted.

As illustrated in FIG. 7, in the element mounting substrate of the second embodiment, at least a part of a transmission line 50D is provided in an interior of the substrate 40. According to this configuration, it is possible to easily make the line length D1 of the transmission line 50D longer than the shortest distance D0 between the first end 51 and the second end 52 by causing the transmission line 50D to detour to the interior of the substrate 40.

To be specific, the transmission line 50D has the first end 51 and the second end 52 provided on the third layer 43 (on the main surface 40*a*) of the substrate 40, a first line portion 53 provided on the second layer 42 of the substrate 40, a first via portion 56 penetrating the third layer 43 to connect the first end 51 and the first line portion 53, and a second via portion 57 penetrating the third layer 43 to connect the second end 52 and the first line portion 53. The line length D1 of the transmission line 50D is a length at the center line of the transmission line 50D, and in this case, is a length at the center line in the thickness direction of the transmission line 50D in a cross section in a plane including the first central axis C1 and the second central axis C2 and orthogonal to the main surface 40*a* of the substrate 40. To be specific, the line length D1 of the transmission line 50D is a length between the first end 51 and the second end 52, that is, a length of the first line portion 53, the first via portion 56, and the second via portion 57.

Figure 8:
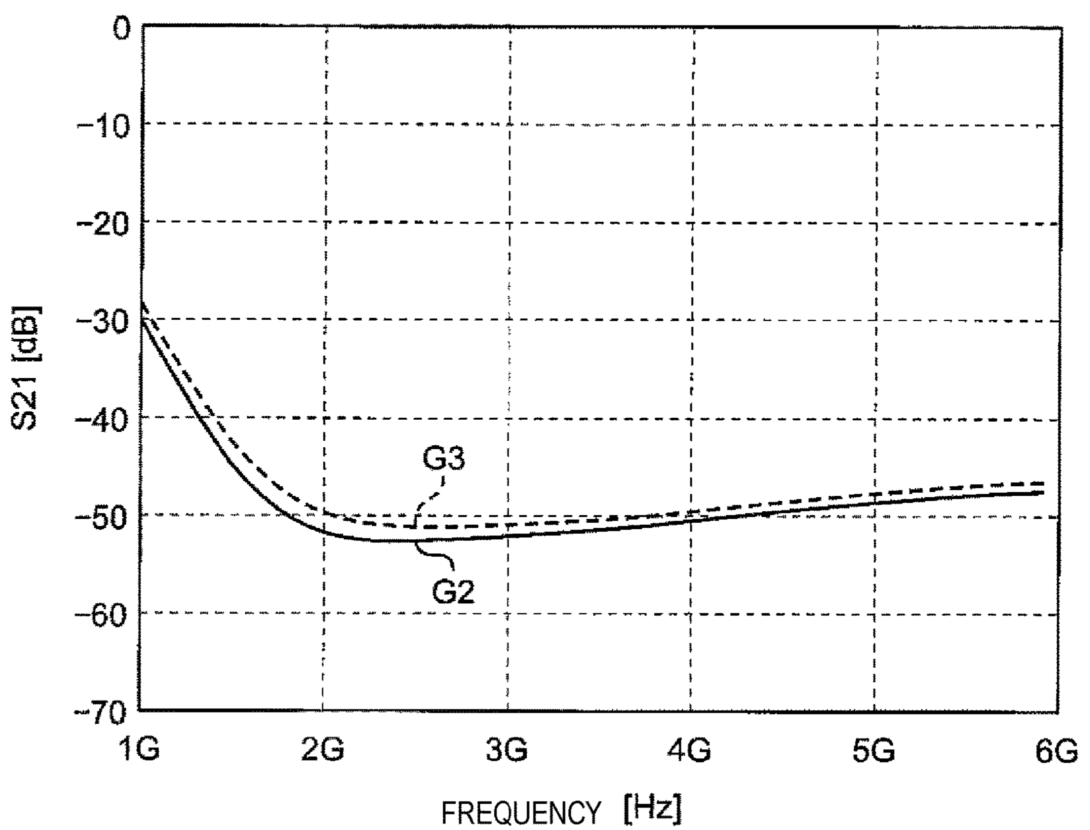
FIG. 8 is a graph illustrating a relationship between frequency and S21 in an example and a comparative example.

An example in this case will be described. FIG. 8 illustrates the relationship between frequency and S21 in the example and a comparative example. In the example, the shortest distance D0 is 0.7 mm, and the line length D1 is longer than the shortest distance D0. In the comparative example, the line length D1 and the shortest distance D0 are 0.7 mm. As illustrated in FIG. 8, a graph G2 of the example shows that a high attenuation characteristic in a wide band can be obtained as compared with a graph G3 of the comparative example.

Figure 9:
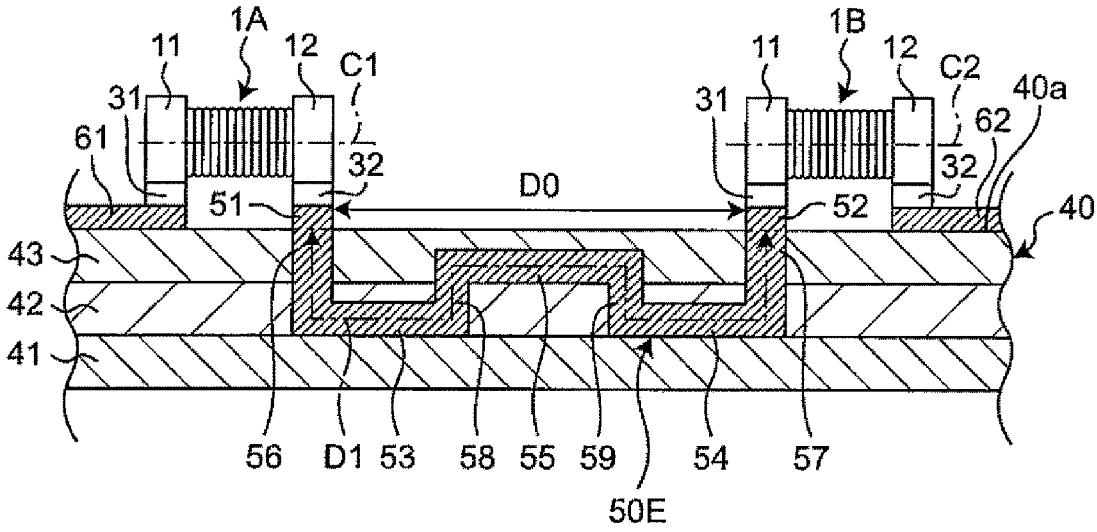
FIG. 9 is a cross-sectional view illustrating another shape of the transmission line.

Further, the shape of the transmission line 50D is not limited to this shape and may be a shape as illustrated in FIG. 9. As illustrated in FIG. 9, a transmission line 50E includes the first end 51 and the second end 52 provided on the third layer 43 (on the main surface 40*a*) of the substrate 40, the first line portion 53 and a second line portion 54 provided on the first layer 41 of the substrate 40, a third line portion 55 provided on the second layer 42 of the substrate 40, the first via portion 56 penetrating the third layer 43 and the second layer 42 to connect the first end 51 and the first line portion 53, the second via portion 57 penetrating the third layer 43 and the second layer 42 to connect the second end 52 and the second line portion 54, a third via portion 58 penetrating the second layer 42 to connect the first line portion 53 and the third line portion 55, and a fourth via portion 59 penetrating the second layer 42 to connect the second line portion 54 and the third line portion 55. According to this, since the first line portion 53 and the second line portion 54 and the third line portion 55 are arranged in different layers, for example, it is possible to provide the transmission line 50E while avoiding other wirings provided in the first layer 41 and the second layer 42.

Third Embodiment

Figure 10:
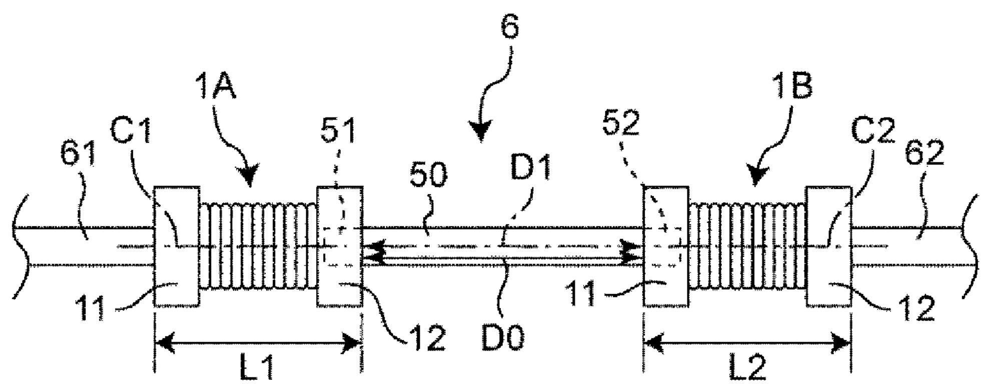
FIG. 10 is a cross-sectional view illustrating an element mounting substrate according to a third embodiment.

FIG. 10 is a cross-sectional view illustrating an element mounting substrate of a third embodiment. The third embodiment is different from the first embodiment in the line length of the transmission line. This different configuration will be described below. The other configurations are the same as those of the first embodiment, and are denoted by the same reference numerals as those of the first embodiment, and descriptions thereof are omitted.

As illustrated in FIG. 10, in the element mounting substrate of the third embodiment, the line length D1 of the transmission line 50 may satisfy at least one of the following first configuration and second configuration regardless of the comparison between the line length D1 and the shortest distance D0.

As the first configuration, the line length D1 of the transmission line 50 is equal to or more than 0.2 mm. According to this configuration, it is possible for the filter unit 6 composed of the first impedance element 1A, the transmission line 50, and the second impedance element 1B to obtain high attenuation characteristics in a wide band by using the characteristic impedance of the transmission line 50. Preferably, the line length D1 of the transmission line 50 is equal to or less than 1.0 mm. According to this, the element mounting substrate can be miniaturized without making the transmission line 50 longer than necessary.

As the second configuration, the line length D1 of the transmission line 50 is equal to or more than a half of the length, which is not a longer one, of the first length L1 of the first impedance element 1A in the direction of the first central axis C1 and the second length L2 of the second impedance element 1B in the direction of the second central axis C2. In this embodiment, the first length L1 and the second length L2 are the same length. According to this configuration, it is possible for the filter unit 6 composed of the first impedance element 1A, the transmission line 50, and the second impedance element 1B to obtain high attenuation characteristics in a wide band by using the characteristic impedance of the transmission line 50. Preferably, the line length D1 of the transmission line 50 is equal to or less than 0.5 times the length, which is not a longer one, of the first length L1 and the second length L2. According to this, the element mounting substrate can be miniaturized without making the transmission line 50 longer than necessary.

In the first configuration and the second configuration, the line length D1 of the transmission line 50 is preferably the same as the shortest distance D0. According to this configuration, it is not necessary to detour the transmission line 50, and the transmission line 50 can be easily wired.

Figure 11:
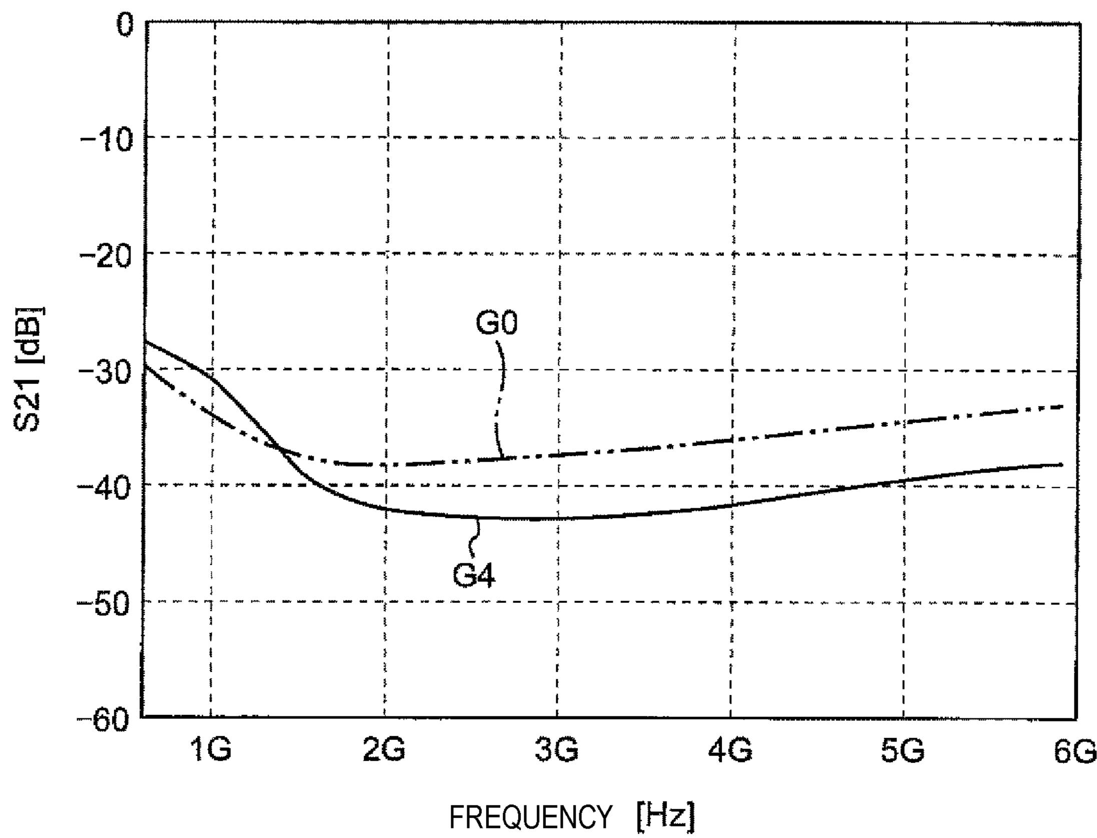
FIG. 11 is a graph illustrating a relationship between frequency and S21 in an example and a comparative example.

An example in this case will be described. FIG. 11 illustrates the relationship between frequency and S21 in the example and a comparative example. In the example, the line length D1 and the shortest distance D0 are 1.3 mm. In the comparative example, the line length D1 and the shortest distance D0 are 0.1 mm. As illustrated in FIG. 11, a graph G4 of the example shows that a high attenuation characteristic in a wide band can be obtained as compared with the graph G0 of the comparative example.

Fourth Embodiment

Next, an adjustment method for adjusting the antiresonance position of the element mounting substrate will be described. The configuration of the element mounting substrate may be any one of the configurations of the first to third embodiments. Hereinafter, description will be made using the third embodiment (FIG. 10).

In this adjustment method, the anti-resonant frequencies of signals passing through the first impedance element 1A, the transmission line 50, and the second impedance element 1B in this order are adjusted by the length of the line length D1 of the transmission line 50 that electrically connects the second electrode 32 of the first impedance element 1A and the first electrode 31 of the second impedance element 1B in series. According to this configuration, the anti-resonant frequency of the filter unit 6 composed of the first impedance element 1A, the transmission line 50, and the second impedance element 1B can be adjusted by using the characteristic impedance of the transmission line 50, and it is possible for the filter unit 6 to obtain high attenuation characteristics in a wide band.

Figure 12A:
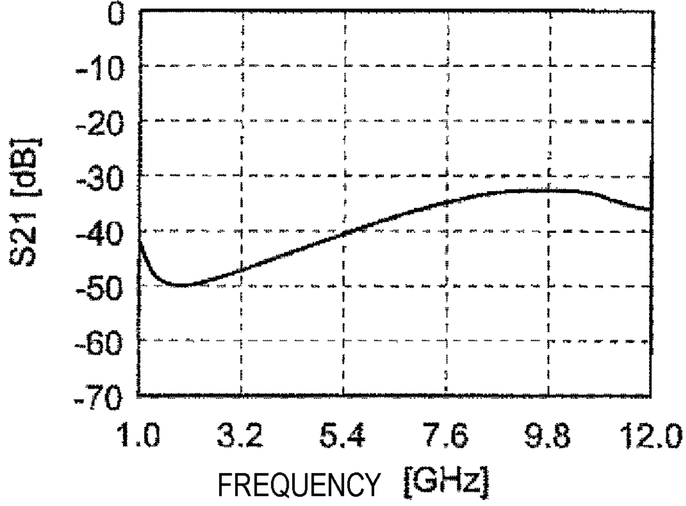
FIG. 12A is a graph illustrating the relationship between frequency and S21 in an example of an adjustment method.
Figure 12B:
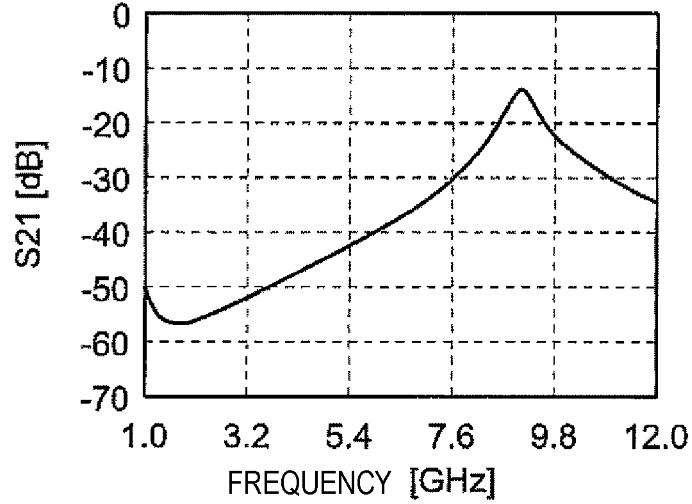
FIG. 12B is a graph illustrating the relationship between frequency and S21 in an example of the adjustment method.
Figure 12C:
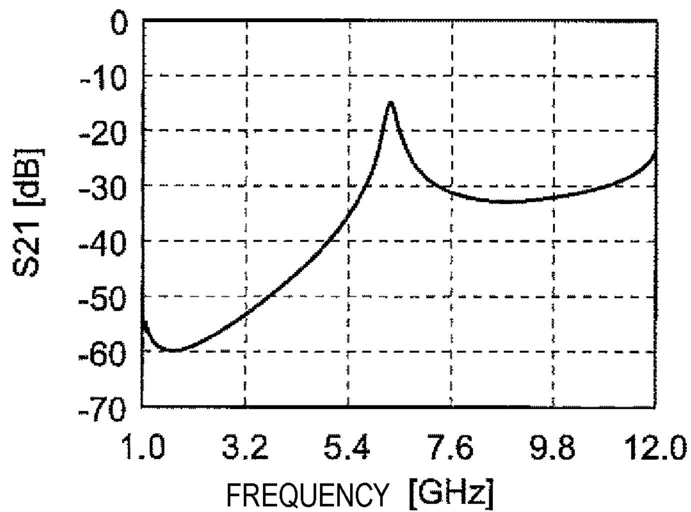
FIG. 12C is a graph illustrating the relationship between frequency and S21 in an example of the adjustment method.

An example in this case will be described. FIG. 12A to FIG. 12C illustrate the relationship between frequency and S21 when the line length D1 is changed. The line length D1 is 5 mm in FIG. 12A, the line length D1 is 10 mm in FIG. 12B, and the line length D1 is 15 mm in FIG. 12C. As illustrated in FIG. 12A to FIG. 12C, by increasing the line length D1, the antiresonance can be shifted to the low frequency region. In this way, the attenuation characteristic at a desired frequency can be adjusted.

Note that the present disclosure is not limited to the above-described embodiments, and design changes can be made without departing from the scope of the present disclosure. For example, the features of the first to fourth embodiments may be combined in various ways.

Although two impedance elements are used in the element mounting substrate in the above embodiments, the number of impedance elements may be increased. In this case, at least two impedance elements may have the above-described transmission line configuration. In addition, a configuration of a transmission line between certain two impedance elements may be different from a configuration of a transmission line between other two impedance elements. Although the wire-wound inductor is used as the impedance element in the above-described embodiment, a multi-layer inductor may be used, or a resistor or a capacitor may be used as the impedance element.

What is claimed is:

1. An element mounting substrate comprising:

a substrate;

a first impedance element and a second impedance element on a main surface of the substrate and each having an electrode; and a transmission line on the substrate and having a first end connected to the electrode of the first impedance element and a second end connected to the electrode of the second impedance element, wherein the first impedance element and the second impedance element are electrically connected in series via the transmission line on the substrate, the transmission line extends perpendicularly from at least one of the first end and the second end, and a line length between the first end and the second end in the transmission line is longer than a shortest distance between the first end and the second end.

2. The element mounting substrate according to claim 1, wherein each of the first impedance element and the second impedance element has a longitudinal direction and a lateral direction parallel to the main surface and orthogonal to each other, and when a straight line parallel to the longitudinal direction and passing through a center in the lateral direction is defined as a central axis, a first central axis that is the central axis of the first impedance element and a second central axis that is the central axis of the second impedance element are on the same straight line when viewed from a direction orthogonal to the main surface of the substrate.

3. The element mounting substrate according to claim 2, wherein the line length is equal to or more than 0.2 mm.

4. The element mounting substrate according to claim 2, wherein the line length is equal to or more than a half of a length, which is not a longer length, of a first length of the first impedance element in the longitudinal direction and a second length of the second impedance element in the longitudinal direction.

5. The element mounting substrate according to claim 1, wherein each of the first impedance element and the second impedance element has a longitudinal direction and a lateral direction parallel to the main surface and orthogonal to each other, and when a straight line parallel to the longitudinal direction and passing through a center in the lateral direction is defined as a central axis, an extension line of a first central axis that is the central axis of the first impedance element and an extension line of a second central axis that is the central axis of the second impedance element intersect at one point when viewed from a direction orthogonal to the main surface of the substrate.

6. The element mounting substrate according to claim 5, wherein the first central axis and the second central axis are orthogonal to each other when viewed from a direction orthogonal to the main surface of the substrate.

7. The element mounting substrate according to claim 1, wherein at least a part of the transmission line is in an interior of the substrate.

8. The element mounting substrate according to claim 1, wherein the line length is equal to or more than 1.05 times of a shortest distance between the first end and the second end.

9. The element mounting substrate according to claim 1, wherein the line length is equal to or more than 0.2 mm.

10. The element mounting substrate according to claim 1, wherein each of the first impedance element and the second impedance element has a longitudinal direction and a lateral direction parallel to the main surface and orthogonal to each other, and the line length is equal to or more than a half of a length, which is not a longer length, of a first length of the first impedance element in the longitudinal direction and a second length of the second impedance element in the longitudinal direction.

11. The element mounting substrate according to claim 1, wherein each of the first impedance element and the second impedance element has a longitudinal direction and a lateral direction parallel to the main surface and orthogonal to each other, when a straight line parallel to the longitudinal direction and passing through a center in the lateral direction is defined as a central axis, a first central axis that is the central axis of the first impedance element and a second central axis that is the central axis of the second impedance element are parallel to each other when viewed from a direction orthogonal to the main surface of the substrate, and the first impedance element and the second impedance element are not lined up in a direction orthogonal to the first central axis and the second central axis when viewed from a direction orthogonal to the main surface of the substrate.

12. The element mounting substrate according to claim 1, wherein the transmission line is on the main surface of the substrate.

13. The element mounting substrate according to claim 1, wherein the first impedance element and the second impedance element are magnetically coupled.

14. An element mounting substrate comprising:

a substrate;

a first impedance element and a second impedance element on the substrate and each having an electrode; and a transmission line on the substrate and having a first end connected to the electrode of the first impedance element and a second end connected to the electrode of the second impedance element, wherein the first impedance element and the second impedance element are electrically connected in series via the transmission line on the substrate, the first impedance element and the second impedance element are of the same type, and a line length between the first end and the second end in the transmission line is equal to or more than 0.2 mm.

15. The element mounting substrate according to claim 14, wherein the line length is the same as a shortest distance between the first end and the second end.

16. An element mounting substrate comprising:

a substrate;

a first impedance element and a second impedance element on the substrate and each having an electrode; and a transmission line on the substrate and having a first end connected to the electrode of the first impedance element and a second end connected to the electrode of the second impedance element, wherein the first impedance element and the second impedance element are electrically connected in series via the transmission line on the substrate, each of the first impedance element and the second impedance element has a longitudinal direction and a lateral direction parallel to a main surface of the substrate and orthogonal to each other, and a line length between the first end and the second end of the transmission line in the transmission line is equal to or more than a half of a length, which is not a longer length, of a first length of the first impedance element in the longitudinal direction and a second length of the second impedance element in the longitudinal direction.

17. The element mounting substrate according to claim 16, wherein the line length is the same as a shortest distance between the first end and the second end.

18. An adjustment method comprising:

adjusting, by a line length of a transmission line that electrically connects an electrode of a first impedance element and an electrode of a second impedance element in series, an anti-resonant frequency of a signal passing through the first impedance element, the transmission line, and the second impedance element in this order, wherein the transmission line extends perpendicularly from at least one of a first end and a second end.

19. The adjustment method according to claim 18, wherein the first impedance element and the second impedance element are magnetically coupled.

20. The adjustment method according to claim 18, wherein the first impedance element and the second impedance element are of the same type.

* * * * *